(12) United States Patent
Matsuzaki et al.

(10) Patent No.: US 6,387,481 B1
(45) Date of Patent: May 14, 2002

(54) ELECTROPHOTOGRAPHIC OVERHEAD PROJECTOR SHEET

(75) Inventors: Morio Matsuzaki; Akio Hoshino; Osamu Miyakawa; Norio Yabe, all of Saitama-ken (JP)

(73) Assignee: Nippon Paper Industries, Co., Ltd., Tokyo (JP)

( * ) Notice: Subject to any disclaimer, the term of this patent is extended or adjusted under 35 U.S.C. 154(b) by 0 days.

(21) Appl. No.: 09/697,156

(22) Filed: Oct. 27, 2000

(30) Foreign Application Priority Data

Oct. 29, 1999 (JP) ............................ 11-310340

(51) Int. Cl.⁷ ................. B32B 27/06; B32B 27/20; B32B 27/36
(52) U.S. Cl. ............... 428/323; 428/212; 428/213; 428/346; 428/480; 428/355 R; 428/195; 430/9; 430/13; 430/14
(58) Field of Search ................ 428/212, 213, 428/323, 328, 330, 331, 195, 203, 346, 355 R, 480; 430/9, 13, 14; 399/320, 328

(56) References Cited

U.S. PATENT DOCUMENTS

| | | | |
|---|---|---|---|
| 4,529,650 A | * | 7/1985 | Martinez ................... 428/336 |
| 5,428,435 A | * | 6/1995 | Yasuda et al. ............. 355/295 |
| 5,620,821 A | * | 4/1997 | Ogura ......................... 430/42 |

FOREIGN PATENT DOCUMENTS

| | | | |
|---|---|---|---|
| JP | 06-019180 | * | 1/1994 |
| JP | 06-324509 A | * | 11/1994 |
| JP | 07-199515 A | * | 8/1995 |

* cited by examiner

*Primary Examiner*—Vivian Chen
(74) *Attorney, Agent, or Firm*—Millen, White, Zelano & Branigan, P.C.

(57) ABSTRACT

An electrophotographic OHP sheet comprising a transparent support and a toner-receiving layer formed on one side of the support, with the toner-receiving layer having suitability for toner fixation at a temperature in the neighborhood of 160° C. to 200° C. and comprising (a) a resin having a softening point of from 180° C. to about 190° C., (b) a resin having a softening point of from 110° C. to 140° C. and (c) a plasticizer having a plasticizing efficiency of 1.1 or below.

7 Claims, 1 Drawing Sheet

ELECTROPHOTOGRAPHIC OVERHEAD PROJECTOR SHEET

FIELD OF THE INVENTION

The present invention relates to an overhead projector sheet (hereinafter abbreviated as "an OHP sheet") for forming images thereon by the use of an electrophotographic recording system.

BACKGROUND OF THE INVENTION

In recent years, full-color copiers utilizing an electrophotographic recording system have been placed on the market by various manufacturers of electric appliances. Very recently full-color electrophotographic copying technology has made a remarkable progress, and copiers capable of providing recorded images of near-graphic arts quality or near-photographic print quality have come to appear on the market.

However, on viewing electrophotographic OHP sheets used in full-color copiers on the electrophotographic recording system, we observe that problems still remain to be solved. The particularly serious problem consists in that the OHP sheets after image formation have a very greasy touch to leave unpleasant feeling to the users' fingers. This problem is caused by transfer of oil such as silicone oil, which is applied to a fixing roller at the time of toner fixation, onto the OHP sheet surface.

Further, as the images recorded on OHP sheets are projected on a screen through an overhead projector (hereinafter abbreviated as "OHP"), the OHP sheet are required to ensure not only excellent color reproducibility but also high transparency in the recorded images.

In the case of recording images on electrophotographic OHP sheets by means of a full-color copiers on the electrophotographic recording system, the thermal fixation of toner images has so far been carried out at a lower speed (referred to as "OHP mode") than the fixation speed for copying paper (referred to as "PAPER mode") for the purpose of increasing the toner fixability and enhancing the transparency of recorded images. When the PAPER mode is actually used for recording images on commercially available electrophotographic OHP sheets, the images recorded are inferior in transparency, and so they cannot ensure good lightness, saturation and color reproducibility in the images projected on a screen to result in projection of brackish gray images. Therefore, it has so far been desired to develop electrophotographic OHP sheets which can provide images having excellent color reproducibility and high transparency even when the recording is carried out at a higher fixing speed (in PAPER mode).

In order to solve the aforementioned problems, various manufacturers of electric appliances have developed electrophotographic recording system-utilized copiers enabling complete or considerable elimination of oil supply to fixing rollers (heat rollers) at the time of toner fixation and thereby leaving no oily touch on the OHP sheet surface, and further enabling high-speed recording through thermal treatment with high-temperature fixing rollers.

However, when conventional electrophotographic OHP sheets are used in those newly developed copiers, problems as mentioned below come up.

Firstly the electrophotographic OHP sheet disclosed in Japanese Tokkai Hei 5-289390 (the term "Tokkai" as used herein means an "unexamined published patent application") is taken as an example, which has a toner-receiving layer comprising polyester resin having a glass transition temperature of 40–75° C. and a molecular weight of 1,000 to 20,000 and a matting agent having a particle size equal to or greater than the thickness of the toner-receiving layer.

When the recording on such a sheet is carried out at a low speed with a conventional type of electrophotographic copier having a large supply of oil, the sheet can ensure good running ability and recorded images of high transparency. In the case of high-speed recording, however, the sheet has a problem that the images recorded thereon are inferior in color reproducibility and transparency because it is difficult to soften the toner-receiving layer in an instant by heat applied for toner fixation and so the toner cannot be buried instantaneously into the toner-receiving layer.

In the case of recording with an electrophotographic copier of the type which is reduced in oil supply, on the other hand, there occurs a problem that the foregoing OHP sheet is apt to entwine itself about the fixing roller and so the transportability thereof becomes poor.

In addition, the electrophotographic OHP sheet having a toner-receiving layer constituted of a thermoplastic resin, such as polyester resin, styrene-acrylic resin or epoxy resin, and a plasticizer containing at least one per molecule of aromatic ring or a polyalkyleneoxide polyol plasticizer is disclosed in JP-A-9-152736. This reference further discloses that the suitable softening point of the resin is from 40 to 180° C., preferably from 90 to 140° C.

The plasticizer added to the toner-receiving layer of the electrophotographic OHP sheet has an effect of increasing the fluidity of the toner-receiving layer upon application of fixing heat, and thereby the color reproducibility and transparency of recorded images can be enhanced so far as the recording is carried out with a conventional type of electrophotographic copier having a full supply of oil. In the case of using an oil supply-reduced electrophotographic copier, however, such an OHP sheet has problems that it still has a tendency to entwine itself about the fixing roller and the images recorded thereon at a high fixing speed are inferior in color reproducibility and transparency. Further, the compatibility between the thermoplastic resin and the plasticizer is poor, and so the plasticizer is liable to bleed with a lapse of time. As a result, the foregoing OHP sheet has a problem that the efficiency in winding for finishing it as a product is low and the keeping quality in process of being distributed as a product is inferior (to cause a blocking trouble).

In other words, every OHP sheet according to the prior arts fails to achieve good travelling properties and high-speed recording suitability as well as to have no oily feel when it is applied to an electrophotographic copier having a reduced oil supply.

SUMMARY OF THE INVENTION

Therefore, the present invention is made for solving the aforementioned problems. In other words, an object of the invention is to provide an electrophotographic OHP sheet which not only ensures no oily feel on the recorded surface but also has excellent travelling properties and high-speed recording suitability when the recording is performed thereon by means of an electrophotographic copier of the type which requires no oil supply to the fixing roller or can accomplish an oil supply to the fixing roller by the use of non-woven cloth impregnated with a slight amount of oil, or by means of a color laser printer. Additionally, electrophotographic OHP sheets according to the invention are intended to also have applicability to conventional type of electrophotographic copiers wherein a large quantity of oil is supplied to the fixing rollers.

The foregoing object of the present invention is attained with an electrophotographic OHP sheet comprising a transparent support and a toner-receiving layer formed on one side of the support, characterized in that the toner-receiving layer has suitability for toner fixation at a temperature in the neighborhood of 160° C. to 200° C. and comprises (a) a resin having a softening point of from 180° C. to about 190° C., (b) a resin having a softening point of from 110° C. to 140° C. and (c) a plasticizer having a plasticizing efficiency of 1.1 or below.

By further adding to the toner-receiving layer (d) a matting agent the grain size of which is in the range of 3 to 20 μm and at least 1.2 times the thickness of the toner-receiving layer, the travelling properties, in particular, of the present electrophotographic OHP sheet can be improved. Furthermore, the present electrophotographic OHP sheet can have thereon highly transparent recorded images, in particular, by using a polyester plasticizer as the plasticizer (c).

Figure 1:
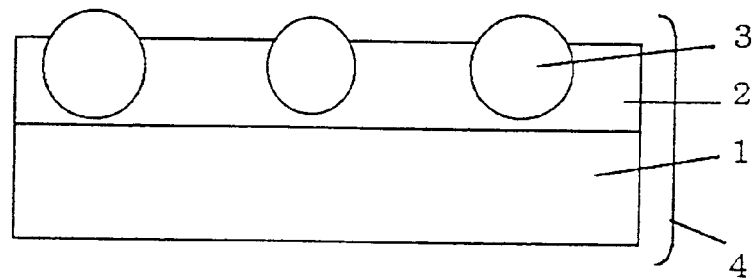
FIG. 1 is a cross-sectional view showing a structure of one embodiment of an electrophotographic OHP sheet relating to the invention.

The reference numerals in FIG. 1 are explained below:

1. Transparent support
2. Toner-receiving layer
3. Matting agent
4. Electrophotographic OHP sheet

DETAILED DESCRIPTION OF THE INVENTION

Electrophotographic OHP sheets relating to the invention are illustrated below by reference to the foregoing drawing. FIG. 1 is a cross-sectional view showing in part the structure of one embodiment of an electrophotographic OHP sheet according to the invention.

The present electrophotographic OHP sheet (4) can be prepared by providing on one side of a transparent support (1) a toner-receiving layer (2) containing as main components a mixture of resins having different softening points and a plasticizer.

Examples of a transparent support usable in the invention include known plastic sheets, such as polyethylene terephthalate, triacetyl cellulose, polycarbonate, polyethylene, polypropylene, polystyrene and polyethylene naphthalate sheets. Of these sheets, biaxially stretched polyethylene terephthalate sheets are preferred over the others because of their excellent strength, heat resistance and dimensional stability. The suitable thickness of a transparent support is from 50 to 250 μm, preferably from 75 to 200 μm. The transparent support may undergo treatment for easy adhesion or be coated with an anchor layer on either side or both sides thereof, if desired.

The toner-receiving layer constituting the present OHP sheet is required to have sufficient adhesion to the transparent support and excellent compatibility with toner binder, to enable toner to be embedded therein through instantaneous softening by fixation heat, and to be an image forming layer capable of ensuring excellent color reproducibility and transparency in the images formed. Further, it is required for the present toner-receiving layer to cause no adhesion to the fixing roller of an electrophotographic copier at the time of toner fixation and thereby prevent the sheet from entwining itself about the fixing roller.

In accordance with the invention, therefore, (a) a resin having a softening point of from 180° C. to about 190° C., (b) a resin having a softening point of from 110° C. to 140° C. and (c) a plasticizer having a plasticizing efficiency of 1.1 or below are present together in the toner-receiving layer. As a result, the present electrophotographic OHP sheet can be prevented from entwining itself about the high-temperature fixing roller (heated up to the neighborhood of 160° C. to 200° C.) of an electrophotographic copier to have high-speed recording suitability, and besides, it can ensure excellent color reproduction and high transparency in the images recorded thereon.

As the resin (a) incorporated in the present toner-receiving layer, any resins can be used as far as their softening points are from 180° C. to about 190° C.; while the resin (b) incorporated in the present toner-receiving layer may be any of resins as far as they have their softening points in the range of 110° C. to 140° C. From the viewpoint of compatibility with toner binders, however, polyester resins are preferred as those resins. In particular, saturated copolymerized polyester resins are used to advantage. Additionally, the softening point measurements are made in accordance with JIS-K-2531 (ring and ball method).

In the present toner-receiving layer, it is appropriate to mix the resin (a) having a softening point of from 180° C. to about 190° C. and the resin (b) having a softening point of from 110° C. to 140° C. in an (a)/(b) ratio of from 80/20 to 30/70 by weight, preferably from 70/30 to 35/65 by weight. When the mixing ratio is in the foregoing range, the electrophotographic OHP sheet can have good travelling capability, and besides, it can ensure excellent color reproduction and transparency in the images recorded thereon.

On the other hand, in the case where the toner-receiving layer is free of resin (a) having a softening point of from 180° C. to about 190° C., or the resin (b) having a softening point of from 110° C. to 140° C. is mixed in the toner-receiving layer in a proportion higher than 70 parts by weight, or the resin (a) is mixed with a resin having a softening point lower than 110° C., the resulting OHP sheet tends to entwine itself about a fixing roller, and besides, it tends to cause a blocking trouble during winding for finishing it as a product and in process of being distributed as a product; as a result, the keeping quality thereof deteriorates.

In the other case where the resin (a) alone or a combination of the resin (a) and a resin having its softening point lower than 180° C. but higher than 140° C. is used as the resin in a toner-receiving layer, the resulting toner-receiving layer shows inferior softening characteristics when fixation heat is applied thereto; as a result, the images recorded thereon undergo deterioration in color reproduction and transparency and become blackish gray.

The plasticizers usable in the present toner-receiving layer are plasticizers which have excellent compatibility with both resins forming the toner-receiving layer as well as toner binders and don't impair the transparency of the toner-receiving layer. When heat is applied at the time of toner fixation, these plasticizers function so as to promote the softening of the toner-receiving layer and enable the toner to be instantaneously buried into the toner-receiving layer; as a result, they can contribute to improvements in the high-speed recording suitability and recorded image transparency.

As the plasticizer of the present toner-receiving layer, it is desirable to select a plasticizer whose compatibility with the resins constituting the toner-receiving layer is high enough not to bleed from the toner-receiving layer with the lapse of time. In the invention, it is especially desirable to use a plasticizer having a plasticizing efficiency of 1.1 or below.

The term "plasticizing efficienty" as used herein is defined as the value obtained by dividing the amount, expressed in parts by weight, of each plasticizer added to vinyl chloride resin for attaining the same value as the 100% modulus value in the case of mixing 50 parts by weight of dioctyl phthalate (abbreviated as "DOP") with the vinyl chloride resin by 50 as the amount, expressed in parts by weight, of DOP added. Accordingly, the plasticizers can promote more effectively the plasticization of resins the lower their plasticizing efficiency values are.

It is advantageous to use polyester plasticizers as the plasticizer incorporated in the present toner-receiving layer. In particular, plasticizers of aliphatic dibasic acid ester type are preferred over the others.

The suitable ratio of the total resins to the plasticizer in the present toner-receiving layer is from 95/5 to 80/20 by weight.

By mixing the plasticizer in a proportion of 5 weight % or above, it can be achieved efficiently to bury toner instantaneously into the toner-receiving layer upon heating in the stage of toner fixation; as a result, the images recorded on the toner-receiving layer at a high speed can have improved color reproduction and transparency. However, the plasticizer mixed in a proportion greater than 20 weight % tends to cause troubles such that the resulting OHP sheet entwines itself about a fixing roller at the time of toner fixation and suffers blocking during winding operation for finish as a product and in process of being distributed as a product (in other words, deterioration in keeping quality). In the invention, it is favorable to add a matting agent to a toner-receiving layer. The addition of a matting agent enables the resulting OHP sheet to travel smoothly through an electrophotographic copier (especially to be prevented from entwine itself about a fixing roller at the time of toner fixation), to cause no trouble during winding operation for finish as a product, and to retain a good keeping quality in process of being distributed as a product (to cause no blocking trouble).

Examples of a matting agent usable in the invention include inorganic pigments, such as silica, calcium carbonate, magnesium carbonate and calcium silicate, and organic pigments such as polystyrene, polymethyl methacrylate, polyester and styrene/acrylic resin powders.

Further, as shown in FIG. 1, it is appropriate to add a matting agent capable of forming projections on the toner-receiving layer surface. In particular, it is advantageous to add a matting agent having an average particle size greater than the thickness of the toner-receiving layer by a factor of at least 1.2. The average particle size of a matting agent used can be chosen properly depending on the thickness of the toner-receiving layer, but it is preferably from 3 to 20 $\mu$m.

It is undesirable for the matting agent to have an average particle size smaller than the thickness of the toner-receiving layer, because the OHP sheet containing such a matting agent tends to entwine itself about the fixing roller during fixation. Therefore, it is preferable that the average particle size of a matting agent used in the invention be greater than the thickness of the toner-receiving layer, especially by a factor of at least 1.2.

On the other hand, it is undesirable for the matting agent to have an average particle size greater than 20 $\mu$m. This is because the matting agent is apt to be conspicuous for its grainy feel on viewing the images projected onto a screen by means of OHP (specifically it can be visually recognized as coarse black grains).

Additionally, the foregoing numeric values of average particle sizes of matting agents are values determined by the measurement of particle size distribution according to Coulter counter method.

The suitable thickness of the present toner-receiving layer is of the order of 2.5–15.0 $\mu$m, preferably 3–10 $\mu$m. When the toner-receiving layer has a thickness thinner than 2.5 $\mu$m, it cannot be attained by toner fixation to bury toner in the toner-receiving layer in a satisfactory state; as a result, the color reproduction and transparency of toner images recorded are apt to be lowered, and the images projected onto a screen by means of OHP become blackish gray. On the other hand, the toner-receiving layer having a thickness increased beyond 15.0 $\mu$m cannot bring about further improvements in color reproduction and transparency of recorded images, but only becomes uneconomical.

By further adding an anti-static agent to the present toner-receiving layer, the present electrophotographic OHP sheet can have improved antistatic effect, and adhesion of toner particles to the toner-receiving layer becomes easy. In other words, the toner-receiving layer can be reduced in surface resistance by the addition of an anti-static agent.

The suitable amount of anti-static agent added is determined depending on the surface resistance of the toner-receiving layer. Although the suitable surface resistance varies among electrophotographic copiers, the present toner-receiving layer is generally adjusted so as to have a surface resistance in the range of $1 \times 10^7$ to $1 \times 10^{12} \Omega$. When the surface resistance is lower than $1 \times 10^7 \Omega$, electrification of the toner-receiving layer is insufficient, and so there occurs a trouble that toner particles are liable to scatter without adhering to the toner-receiving layer; while, when it is higher than $1 \times 10^{12} \Omega$, smooth travelling of electrophotographic OHP sheet through an electrophotographic copier becomes difficult and transfer of toner particles does not occur. Further, it is advantageous that the surface resistance of toner-receiving layer be from $1 \times 10^8$ to $1 \times 10^{11} \Omega$.

Examples of an anti-static agent usable in the invention include nonionic anti-static agents, such as fatty acid esters, and cationic anti-static agents such as polyamine derivatives and quaternary ammonium salts.

Furthermore, it is favorable to provide an anti-static layer on the rear side of the support, the side opposite to the toner-receiving layer, for the purpose of improving the travelling capability of the electrophotographic OHP sheet and preventing dust adhesion. As the present electrophotographic OHP sheet is heated to a temperature of about 160° C. to about 200° C. upon toner fixation, the antistatic layer provided in the invention is preferably resistant to heat, and it can be formed, e.g., by causing thermal cross-linking reaction in a mixture of melamine-acrylic copolymer and a quaternary ammonium salt in the presence of an organic acid.

The present toner-receiving layer can be formed using various coating methods known to persons skilled in the arts. For instance, Mayer bar coating, die coating, gravure coating, comma coating, blade coating and spray coating methods can be adopted.

Electrophotographic OHP sheets according to the invention can have high-speed recording suitability and smooth travelling capability, and ensure excellent color reproduction and high transparency in the images recorded thereon, and further have no oily feel on the recorded surface even when they are applied to electrophotographic copiers of the type which requires no oil supply to the fixing roller or can accomplish an oil supply to the fixing roller by the use of non-woven cloth impregnated with a slight amount of oil, or by means of a color laser printer. In other words, the present electrophotographic OHP sheets show significant improvements in properties over conventional ones.

Now, the invention is illustrated in more detail by reference to the following examples, but these examples should not be construed as limiting the scope of the invention in any way. Additionally, all "parts" in the following descriptions are by weight unless otherwise indicated.

The entire disclosure of all application, patents and publications, cited above and below, and of corresponding Japanese application No. 11-310340, filed Oct. 29, 1999, is hereby incorporated by reference.

EXAMPLE 1

On one side of a 100 $\mu$m-thick transparent polyethylene terephthalate sheet as a support, the composition described below was coated and dried so as to have a thickness of 0.1 $\mu$m on a solids basis, thereby forming an antistatic layer.

| Composition for forming Antistatic Layer: | |
|---|---|
| Melamine-acrylic copolymer resin (Tesfine 322, trade name, a product of Hitachi Kasei Polymer Co., Ltd.) | 1.0 parts |
| Quaternary ammonium salt (Saftomer ST2000H, trade name, a product of Mitshubishi Chemical Co.) | 1.0 parts |
| Organic acid (p-toluenesulfonic acid, produced by Kanto Chemical Co., Inc.) | 0.1 parts |
| Toluene | 50.0 parts |
| Ethyl acetate | 24.0 parts |
| Methyl ethyl ketone | 23.9 parts |

Then, a coating solution for forming a toner-receiving layer was prepared as follows:

In a solvent constituted of toluene, methyl ethyl ketone and ethyl cellosolve, polyester resin having a softening point of 184° C. and polyester resin having a softening point of 110° C. were mixed in a ratio of 80/20 by weight. Thereto, a plasticizer having a plasticizing efficiency of 1.0 was added in an amount corresponding to a polyester resin mixture/plasticizer ratio of 95 to 5 by weight. Further thereto, silica having a grain size of 6.0 $\mu$m and an antistatic agent were added, and stirred thoroughly. The details of the composition for forming the toner-receiving layer are shown below.

| Composition for forming Toner-receiving Layer: | |
|---|---|
| Polyester resin having a softening point of 184° C. (Elitel UE3690, trade name, a product of Unitika Ltd.) | 7.6 parts |
| Polyester resin having a softening point of 110° C. (Vylon 130, trade name, a product of Toyobo Co., Ltd.) | 1.9 parts |
| Polyester type of plasticizer having a plasticizing efficiency of 1.0 (Adkcizer PN160, trade name, a product of Asahi Denka Kogyo K.K.) | 0.5 parts |
| Inorganic pigment (grain size: 6.0 $\mu$m) (Sylysia 770, trade name, a product of | 0.05 parts |

| -continued | |
|---|---|
| Composition for forming Toner-receiving Layer: | |
| Fuji Silysia Chemical Ltd.) | |
| Antistatic agent (Cyastat SN, trade name, a product of Cytec Industries Inc.) | 0.1 parts |
| Toluene | 60.0 parts |
| Methyl ethyl ketone | 25.0 parts |
| Ethyl cellosolve | 9.85 parts |

Additionally, the same composition as illustrated above, except for no addition of silica, was prepared beforehand, and used for examining coating conditions for achieving the formation of a toner-receiving layer having a dry thickness of 5.0 $\mu$m. On the basis of the conditions examined, the coating composition illustrated above was coated on the other side of the support, or the side opposite to the antistatic layer side, and dried to prepare an electrostatic OHP sheet.

EXAMPLE 2

An electrophotographic OHP sheet was prepared in the same manner as in Example 1, except that the ratio between Erietel UE3690 and Vylon 130 mixed in the toner-receiving layer was changed to 30/70.

EXAMPLE 3

An electrophotographic OHP sheet was prepared in the same manner as in Example 1, except that the ratio between the resin mixture and the plasticizer mixed in the toner-receiving layer was changed to 80/20.

EXAMPLE 4

An electrophotographic OHP sheet was prepared in the same manner as in Example 1, except that the polyester resin having a softening point of 140° C., Elitel UE3620 (trade name, a product of Unitika Ltd.), was used in the toner-receiving layer instead of Vylon 130.

EXAMPLE 5

An electrophotographic OHP sheet was prepared in the same manner as in Example 2, except that the polyester resin having a softening point of 140° C., Elitel UE3620 (trade name, a product of Unitika Ltd.), was used in the toner-receiving layer instead of Vylon 130.

EXAMPLE 6

An electrophotographic OHP sheet was prepared in the same manner as in Example 3, except that the polyester resin having a softening point of 140° C., Elitel UE3620 (trade name, a product of Unitika Ltd.), was used in the toner-receiving layer instead of Vylon 130.

EXAMPLE 7

An electrophotographic OHP sheet was prepared in the same manner as in Example 1, except that the inorganic pigment added to the toner-receiving layer was replaced by an organic pigment having a particle size of 20 $\mu$m, Techpolmer MBX20 (methyl methacrylate polymer particles, trade name, a product of Sekisui Plastics Co., Ltd.).

EXAMPLE 8

The same composition as employed for forming the toner-receiving layer in Example 1, except for no addition of silica, was prepared in advance, and used for examining coating conditions for achieving the formation of a toner-receiving layer having a dry thickness of 3.0 μm. An electrophotographic OHP sheet was prepared in the same manner as in Example 1, except that the composition for a toner-receiving layer was coated and dried on the basis of the conditions examined herein.

EXAMPLE 9

The same composition as employed for forming the toner-receiving layer in Example 1, except for no addition of silica, was prepared in advance, and used for examining coating conditions for achieving the formation of a toner-receiving layer having a dry thickness of 1.5 μm. An electrophotographic OHP sheet was prepared in the same manner as in Example 1, except that the composition for a toner-receiving layer was coated and dried on the basis of the conditions examined herein.

EXAMPLE 10

The same composition as employed for forming the toner-receiving layer in Example 1, except for no addition of silica, was prepared in advance, and used for examining coating conditions for achieving the formation of a toner-receiving layer having a dry thickness of 6.0 μm. An electrophotographic OHP sheet was prepared in the same manner as in Example 1, except that the composition for a toner-receiving layer was coated and dried on the basis of the conditions examined herein.

EXAMPLE 11

An electrophotographic OHP sheet was prepared in the same manner as in Example 1, except that the ratio between the polyester resins, Elitel UE3690 and Vylon 130, mixed in the toner-receiving layer was changed to 85/15.

EXAMPLE 12

An electrophotographic OHP sheet was prepared in the same manner as in Example 1, except that the ratio between the polyester resins, Elitel UE3690 and Vylon 130, mixed in the toner-receiving layer was changed to 25/75.

EXAMPLE 13

An electrophotographic OHP sheet was prepared in the same manner as in Example 1, except that the ratio between the resin mixture and the polyester type of plasticizer mixed in the toner-receiving layer was changed to 97/3.

EXAMPLE 14

An electrophotographic OHP sheet was prepared in the same manner as in Example 1, except that the ratio between the resin mixture and the plasticizer mixed in the toner-receiving layer was changed to 79/21.

Comparative Example 1

An electrophotographic OHP sheet was prepared in the same manner as in Example 1, except that the resin mixture used in the toner-receiving layer was replaced by polyester resin having a softening point of 140° C., Elitel UE3620 (trade name, a product of Unitika Ltd.).

Comparative Example 2

An electrophotographic OHP sheet was prepared in the same manner as in Example 1, except that no plasticizer was added to the toner-receiving layer.

Comparative Example 3

An electrophotographic OHP sheet was prepared in the same manner as in Example 1, except that the plasticizer mixed in the toner-receiving layer was replaced by a polyester type of plasticizer having a plasticizing efficiency of 1.2, Adkcizer PN1430 (trade name, a product of Asahi Denka Kogyo K.K.).

Comparative Example 4

An electrophotographic OHP sheet was prepared in the same manner as in Example 1, except that Vylon 130, one of the mixed resins used in the toner-receiving layer, was replaced by Elitel UE3215 (trade name, a product of Unitika Ltd.) as a polyester resin having a softening point of 145° C.

Comparative Example 5

An electrophotographic OHP sheet was prepared in the same manner as in Example 2, except that Vylon 130, one of the mixed resins used in the toner-receiving layer, was replaced by Elitel UE3400 (trade name, a product of Unitika Ltd.) as a polyester resin having a softening point of 105° C.

Comparative Example 6

An electrophotographic OHP sheet was prepared in the same manner as in Example 1, except that Elitel UE3690 (trade name, a product of Unitika Ltd.), one of the mixed resins used in the toner-receiving layer, was replaced by Vylon 200 (trade name, a product of Toyobo Co., Ltd.) as a polyester resin having a softening point of 165° C.

Comparative Example 7

An electrophotographic OHP sheet was prepared in the same manner as in Example 1, except that the resin mixture of Elitel UE3690 and Vylon 130 used in the toner-receiving layer was replaced by the resin mixture of a polyester resin having a softening point of 163° C., Vylon 200 (trade name, a product of Toyobo Co., Ltd.), and a polyester resin having a softening point of 109° C., Vylon 550 (trade name, a product of Toyobo Co., Ltd.).

Comparative Example 8

An electrophotographic OHP sheet was prepared in the same manner as in Example 7, except that the polyester resin Vylon 200 mixed in the toner-receiving layer was replaced by a polyester resin having a softening point of 123° C., Vylon 300 (trade name, a product of Toyobo Co., Ltd.).

On each of the electrophotographic OHP sheets prepared in Examples 1 to 14 and Comparative Examples 1 to 8, test patterns were printed using a printer of oil supply-reduced type, Color Laser Copier 780PIXEL D10-V made by Canon Inc. (fixation temperature: about 175° C., oil supply means: non-woven cloth impregnated with a slight amount of oil) in a paper mode (under a high-speed printing condition), and further adhesion of each toner-receiving layer to the support and color reproduction and transparency of printed patterns were evaluated respectively by the testing methods mentioned below.

Furthermore, the travelling properties of each electrophotographic OHP sheet (liability of each OHP sheet to entwine itself about the fixing roller upon toner fixation) were examined under a condition that no oil was supplied to the fixing roller by removing the non-woven cloth from the fixing section.

(1) Adhesion to Support

Each printed sheet was rubbed 10 times with hands, and examined for the degree of fallout of the toner-receiving layer. Evaluation criteria adopted herein are as follows;

○ . . . No fallout

Δ . . . Slight fallout

× . . . Much fallout (2) Color Reproduction in Printed Patterns

Of the test patterns printed on each OHP sheet, the patterns having dot percent of 100 to 10% were projected on a screen by means of an overhead projector, and the condition of color reproduction of each color in each printed pattern was evaluated by visual observation. The evaluation criteria adopted herein are as follows;

○ . . . Color reproduction is satisfactory

Δ . . . Color reproduction is more or less inferior because the projected patterns have rather dark colors × . . . Color reproduction is unsatisfactory because the projected patterns are blackish gray in color (3) Transparency of Printed Patterns The patterns printed on each OHP sheet were projected on a screen by means of an overhead projector GPJ-1120 made by Gakken Co., Ltd., and the thus projected patterns were evaluated by visual observation. The evaluation criteria adopted herein are as follows;

○ . . . Projected patterns are bright and clear

Δ . . . Projected patterns are rather dull

× . . . Projected patterns are blackish gray (4) Travelling Properties

The condition of each OHP sheet at the time when the sheet travels through the fixing section for toner fixation was evaluated by the following criteria;

○ . . . OHP sheet travels smoothly

× . . . OHP sheet entwines itself about the fixing roller (5) Keeping Quality

Each electrophotographic OHP sheet was cut into 50 leaves of A4 size. These leaves are superimposed one on top of another, put in a polyethylene bag, stored for 7 days in a drier kept at 40° C., taken away from the bag, and then examined for blocking condition by visual observation. The evaluation criteria adopted therein were as follows;

○ . . . No blocking develops

Δ . . . Leaves bear traces of developing blocking in a spotted state

× . . . Each leaf develops blocking on almost all the surface

Preparation conditions for each electrophotographic OHP sheet are set forth in Tables 1 and 2, and the evaluation results of properties of each electrophotographic OHP sheet prepared under such conditions are shown in Tables 3 and 4.

TABLE 1

Toner-Receiving Layer

| | Ratio between polyester resins mixed (softening point) | | Resin/ Plasticizer ratio | Plasticizing efficiency | Pigment grain size ($\mu$m) | Coating thickness on dry basis ($\mu$m) | Ratio of pigment grain size to toner-receiving layer thickness |
|---|---|---|---|---|---|---|---|
| Example 1 | 80(184° C.) | 20(110° C.) | 95/5 | 1.1 | 6 | 5 | 1.2 |
| Example 2 | 30(184° C.) | 70(110° C.) | 95/5 | 1.1 | 6 | 5 | 1.2 |
| Example 3 | 80(184° C.) | 20(110° C.) | 80/20 | 1.1 | 6 | 5 | 1.2 |
| Example 4 | 80(184° C.) | 20(140° C.) | 95/5 | 1.1 | 6 | 5 | 1.2 |
| Example 5 | 30(184° C.) | 70(140° C.) | 95/5 | 1.1 | 6 | 5 | 1.2 |
| Example 6 | 80(184° C.) | 20(140° C.) | 80/20 | 1.1 | 6 | 5 | 1.2 |
| Example 7 | 80(184° C.) | 20(110° C.) | 95/5 | 1.1 | 20 | 5 | 4.0 |
| Example 8 | 80(184° C.) | 20(110° C.) | 95/5 | 1.1 | 6 | 3 | 2.0 |
| Example 9 | 80(184° C.) | 20(110° C.) | 95/5 | 1.1 | 6 | 1.5 | 4.0 |
| Example 10 | 80(184° C.) | 20(110° C.) | 95/5 | 1.1 | 6 | 6 | 1.0 |
| Example 11 | 85(184° C.) | 15(110° C.) | 95/5 | 1.1 | 6 | 5 | 1.2 |
| Example 12 | 25(184° C.) | 75(110° C.) | 95/5 | 1.1 | 6 | 5 | 1.2 |
| Example 13 | 80(184° C.) | 20(110° C.) | 97/3 | 1.1 | 6 | 5 | 1.2 |
| Example 14 | 80(184° C.) | 20(110° C.) | 79/21 | 1.1 | 6 | 5 | 1.2 |

TABLE 2

Toner-Receiving Layer

| | Ratio between polyester resins mixed (softening point) | | Resin/ Plasticizer ratio | Plasticizing efficiency | Pigment grain size ($\mu$m) | Coating thickness on dry basis ($\mu$m) | Ratio of pigment grain size to toner-receiving layer thickness |
|---|---|---|---|---|---|---|---|
| Compar.Ex.1 | 100(140° C.) | — | 95/5 | 1.1 | 6 | 5 | 1.2 |
| Compar.Ex.2 | 80(184° C.) | 20(110° C.) | — | — | 6 | 5 | 1.2 |
| Compar.Ex.3 | 80(184° C.) | 20(110° C.) | 95/5 | 1.2 | 6 | 5 | 1.2 |
| Compar.Ex.4 | 80(184° C.) | 20(145° C.) | 95/5 | 1.1 | 6 | 5 | 1.2 |
| Compar.Ex.5 | 30(184° C.) | 70(105° C.) | 95/5 | 1.1 | 6 | 5 | 1.2 |
| Compar.Ex.6 | 80(165° C.) | 20(110° C.) | 95/5 | 1.1 | 6 | 5 | 1.2 |
| Compar.Ex.7 | 80(163° C.) | 20(109° C.) | 95/5 | 1.1 | 6 | 5 | 1.2 |
| Compar.Ex.8 | 80(123° C.) | 20(109° C.) | 95/5 | 1.1 | 6 | 5 | 1.2 |

TABLE 3

Evaluation Results of Various Properties

|  | Adhesion to support | Color reproduction in printed patterns | Transparency of printed patterns | Travelling properties | Keeping quality | Total evaluation |
|---|---|---|---|---|---|---|
| Example 1 | ○ | ○ | ○ | ○ | ○ | ○ |
| Example 2 | ○ | ○ | ○ | ○ | ○ | ○ |
| Example 3 | ○ | ○ | ○ | ○ | ○ | ○ |
| Example 4 | ○ | ○ | ○ | ○ | ○ | ○ |
| Example 5 | ○ | ○ | ○ | ○ | ○ | ○ |
| Example 6 | ○ | ○ | ○ | ○ | ○ | ○ |
| Example 7 | ○ | ○ | ○ | ○ | ○ | ○ |
| Example 8 | ○ | ○ | ○ | ○ | ○ | ○ |
| Example 9 | ○ | ○~Δ | ○~Δ | ○ | ○ | ○~Δ |
| Example 10 | ○ | ○ | ○ | Δ | ○ | Δ |
| Example 11 | ○ | ○ | ○ | Δ | Δ | Δ |
| Example 12 | ○ | Δ | Δ | ○ | ○ | Δ |
| Example 13 | ○ | Δ | Δ | ○ | ○ | Δ |
| Example 14 | ○ | ○ | ○ | Δ | Δ | Δ |

TABLE 4

Evaluation Results of Various Properties

|  | Adhesion to support | Color reproduction in printed patterns | Transparency of printed patterns | Travelling properties | Keeping quality | Total evaluation |
|---|---|---|---|---|---|---|
| Compar.Ex.1 | ○ | ○ | ○ | X | X | X |
| Compar.Ex.2 | ○ | X | X | ○ | ○ | X |
| Compar.Ex.3 | ○ | X | X | ○ | ○ | X |
| Compar.Ex.4 | ○ | ○ | ○ | X | X | X |
| Compar.Ex.5 | ○ | ○ | ○ | X | X | X |
| Compar.Ex.6 | ○ | ○ | ○ | X | X | X |
| Compar.Ex.7 | ○ | ○ | ○ | X | X | X |
| Compar.Ex.8 | ○ | ○ | ○ | X | X | X |

As can be seen from Table 3, the electrophotographic OHP sheets prepared in accordance with the invention (Examples 1 to 14), on the whole, have demonstrated excellent properties, including smooth travelling, excellent color reproduction and transparency in the printed images and high keeping quality, when used in an electrophotographic copier free of oil supply to the fixing roller or undergoing an oil supply to the fixing roller by the use of non-woven cloth impregnated with a trace quantity of oil.

On the other hand, the results shown in Table 4 indicate that all the electrophotographic OHP sheets prepared in Comparative Examples 1 to 8 were inferior in one or more of the properties evaluated. Thus, it was confirmed that the comparative sheets were less than satisfactory as an electrophotographic OHP sheet.

What is claimed is:

1. An electrophotographic OHP sheet comprising a transparent support and a toner-receiving layer formed on one side of the support: said toner-receiving layer having suitability for toner fixation at a temperature in the neighborhood of 160° C. to 200° C., and comprising (a) a resin having a softening point of from 180° C. to about 190° C., (b) a resin having a softening point of from 110° C. to 140° C. and (c) a plasticizer having a plasticizing efficiency of 1.1 or below.

2. An electrophotographic OHP sheet according to claim 1, wherein the toner-receiving layer further comprises (d) a matting agent having a grain size which is in the range of 3 to 20 μm and at least 1.2 times the thickness of the toner-receiving layer.

3. An electrophotographic OHP sheet according to claim 1, wherein the plasticizer is a polyester plasticizer.

4. An electrophotographic OHP sheet according to claim 1, wherein the resin (a) and the resin (b) are comprised at an (a)/(b) ratio of from 80/20 to 30/70 by weight.

5. An electrophotographic OHP sheet according to claim 1, wherein the toner-receiving layer has a ratio of the resins (a) and (b) to the plasticizer (c) in the range of 95/5 to 80/20 by weight.

6. An electrophotographic OHP sheet according to claim 1, wherein the toner-receiving layer has a surface resistance in the range of $1 \times 10^7$ to $1 \times 10^{12} \Omega$.

7. An electrophotographic OHP sheet according to claim 1, wherein the support has an anti-static layer on the side opposite to the toner-receiving layer.

* * * * *